Feb. 16, 1971 K. A. LANG Re. 27,065

DIFFUSION FURNACE

Original Filed April 12, 1965 2 Sheets-Sheet 1

INVENTOR.
KARL A. LANG
BY Fulwider, Patton, Rieber Lee and Utecht
ATTORNEYS

DIFFUSION FURNACE

Original Filed April 12, 1965 2 Sheets-Sheet 2

INVENTOR
KARL A. LANG
BY Fulwider, Patton, Rieber
Lee, and Utecht
ATTORNEYS

United States Patent Office

Re. 27,065
Reissued Feb. 16, 1971

27,065

DIFFUSION FURNACE

Karl A. Lang, 93 Rivo Alto Canal,
Long Beach, Calif. 90803

Original No. 3,361,863, dated Jan. 2, 1968, Ser. No. 447,343, Apr. 12, 1965. Application for reissue Dec. 23, 1969, Ser. No. 887,782
Int. Cl. H05b *3/66*
U.S. Cl. 13—25 17 Claims

Matter enclosed in heavy brackets [ ] appears in the original patent but forms no part of this reissue specification; matter printed in italics indicates the additions made by reissue.

ABSTRACT OF THE DISCLOSURE

A diffusion furnace structure having a cabinet which supports stacked modules, each of which includes a drawer tray carrying an elongated capsule enclosing a heating element, the element being electrically connected to the furnace controls such that the element can be quickly disconnected from the cabinet when the tray is opened; and a plurality of metal leaves constituting a part of the electrical conectors for a heating element, and which are bendable to facilitate axial removal of the element through the opening in either of the ends of an elongated diffusion furnace capsule or the like.

This invention relates to furnace structures, and more particularly to improvments in diffusion furnaces.

More specifically, this invention relates to the type of furnace which utilizes an elongated heating coil surrounded by a tube of refractory material. In this type of furnace, thick metal straps are welded to the ends of the coil for connection to a current source. Additionally, the coil is tapped by welding additional straps to selected turns intermediate its ends. Such additional straps are also adapted to be supplied with heating currents from the source to permit the interior of that portion of the coil intermediate the tapped connections to be selectively raised to a higher temperature than that which would be obtained by currents applied through the end connections alone.

Typically, such furnaces are operated with a hollow quartz tube inserted in the heating coil and extending the length thereof. One end of the quartz tube is capped, and materials to be heated in the furnace, such as semiconductor materials and the like, are inserted into the open end of the quartz tube.

In such furnaces as heretofore known, all of the metal straps are led through one end of the furnace, where connections are made to the source of current. Thus, the strap at one end of the furnace is a short element extending through the adjacent end of the furnace, whereas the strap at the opposite end is a member which extends the length of the coil to the end of the furnace where the connections are made to the source. Similarly, the straps for the tapped connections are of different lengths. The reason for this arrangement is to facilitate the removal of the heating coil from one end of the furnace when it is necessary for such coil to be replaced.

In this latter connection, the ends of the straps extending out of the furnace are bent outwardly to permit them to be secured to terminal blocks to which connections from the current source are made. The straps themselves are of relatively large stock, being of the order of an eighth of an inch thick and up to an inch wide, which necessitates their being preformed with the bends in them before they are welded to the heating coil. Accordingly, if these straps were led out of the opposite ends of the furnace, they could not be bent straight to permit the heating coil to be removed from either end of the furnace.

In addition to the foregoing, such prior art furnaces do not lend themselves to ready replacement of heating elements in certain environments, such as so-called "clean rooms," in which it is essential to eliminate all possible dirt from the surrounding air. Such furnaces are built in large, heavy supporting structures, and are expensive. Since a heating element cannot be removed from a furnace without releasing particles of refractory material in the surrounding air, its replacement in such surroundings cannot be tolerated. Rather, it is necessary to remove the entire furnace support structure from the area in order to make the necessary change, and bring it back in after the change is made.

Such operations involve considerable labor and expense, and keep the furnace out of commission for an undesirably long period of time. Frequently, in order to keep a production line going, a complete furnace and suport structure must be installed in place of the one being serviced.

It is an object of my invention to provide an improved furnace structure which overcomes the above and other disadvantages of the prior art.

Another object of my invention is to provide a diffusion furnace in which strap connections to different points on the heating coil can be led out of the ends of the furnace nearest their connections, and still permit the heating coil to be removed from either end of the furnace.

A further object of my invention is to provide an improved furnace structure in the form of a portable cartridge unit containing the heating coil, and which can readily be removed from a supporting structure and carried out of a work area when it is necessary to replace the heating element.

Yet another object of my invention is to provide a furnace structure in which individual portable furnace units of light weight can be arranged in a stack, but wherein each is separately and easily removable from the stack to permit it to be replaced with a similar unit.

It is also an object of my invention to provide a unique diffusion furnace, comprising a minimum number of component parts of simple design and rugged construction.

The above and other objects and advantages of my invention will become apparent from the following description taken in conjunction with the accompanying drawings of an illustrative embodiment thereof, in which:

FIGURE 1 is a perspective view of a furnace structure in which a pair of replaceable cartridge heating assemblies are arranged in a stack on a base cabinet structure which houses controls for the heating elements in the heating assemblies, each heating assembly being located in a respective cabinet module, with one of the modules having its front panel removed and the cartridge therein moved to the exterior by means of the drawer mechanism on which it is carried;

Figure 6:
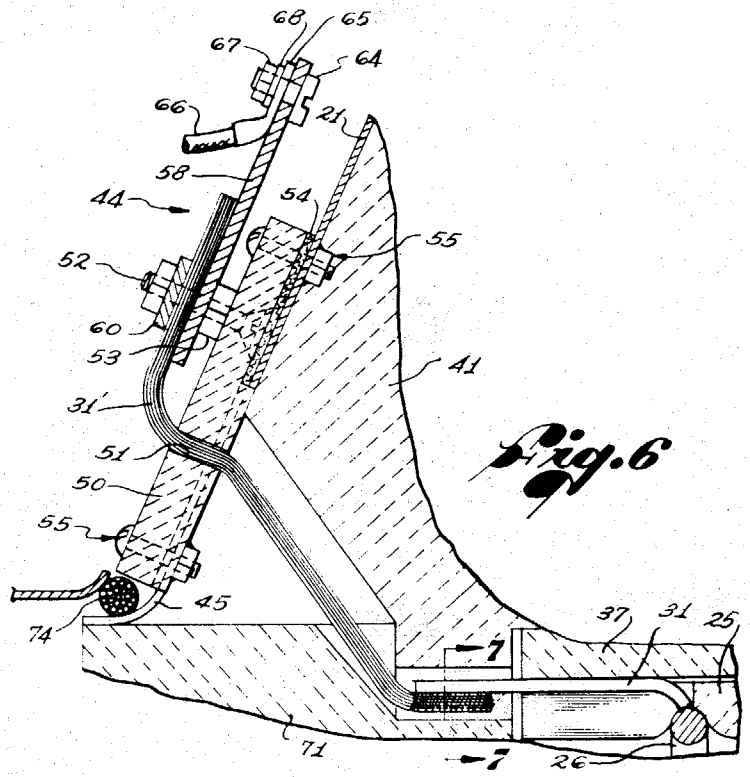
Figure 7:
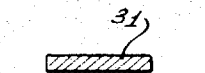

FIGURE 6 is an enlarged sectional view of one of the terminal blocks mounted over a slot in the end of the cartridge housing, showing more clearly the manner in which the metal leaves welded to one of the strap connections to the heating coil are directed through the slot in the housing and secured to the terminal block; and FIGURE 7 is a sectional view taken along the line 7—7 of FIGURE 6, showing the portions of the metal strap and the metal leaves where they are welded together.

Figure 1:
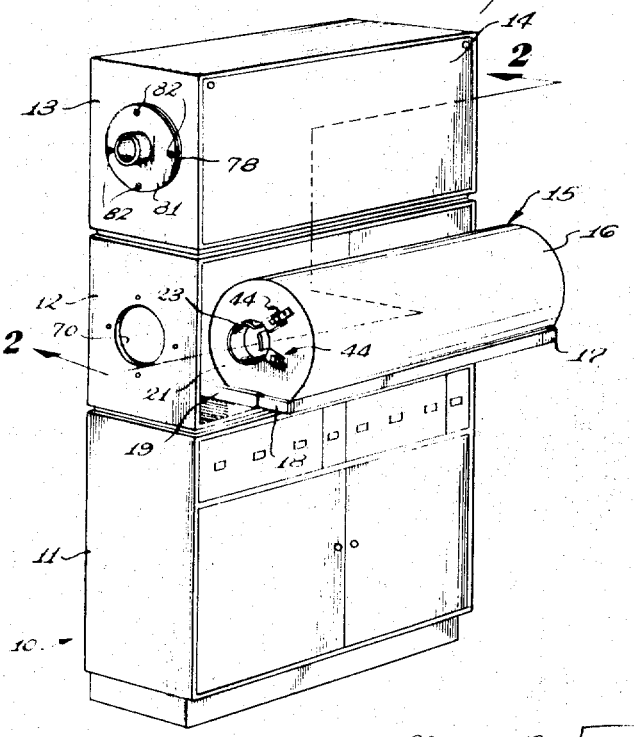

Referring to FIGURE 1, the furnace structure 10 is formed of a base cabinet 11 on top of which is supported a stack of pairs of cabinet modules 12, 13 which support individual cartridge heating assemblies. The modules 12, 13 are identical in construction, each being provided with a front panel, as indicated at 14 for the module 13, which can readily be attached to and removed from the front of the module. Within each module is a cartridge heating assembly 15 which has an elongated housing 16 that sets in a drawer tray 17. The tray 17 is adapted to be pulled out a sufficient distance to permit the housing 16 to be lifted out of the tray for servicing and/or replacement. As indicated, the tray 17 is provided with side bars 18 slidably mounted in channels 19 which are secured to the sides of the module 12. The bars 18 may be adapted to glide on suitable bearings within the channel 19 in the manner employed in conventional drawer constructions for filing cabinets and the like.

Figure 2:
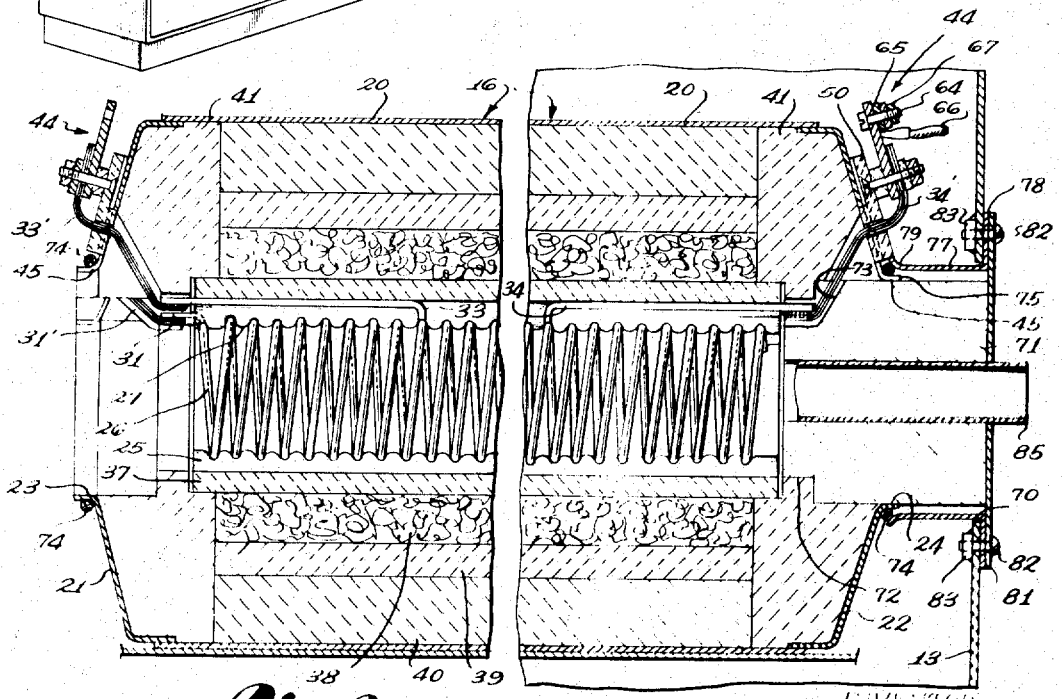
FIGURE 2 is a fragmentary sectional view taken along the line 2—2 of FIGURE 1, showing the internal constructions for the cartridge units.

Each cartridge assembly 15 is a complete furnace unit. Referring to FIGURE 2, the housing 16 is formed of a cylindrical tube 20 having end caps 21, 22 having aligned central openings 23, 24. Extending through the center of the housing is a tube 25 of refractory material within which is an elongated heating coil 26. Preferably the tube 25 is formed with an interior groove to nestably receive the outer portions of the turns of the coils, whereby the internal rib, indicated at 27, extends between the turns of the coil.

Figure 3:
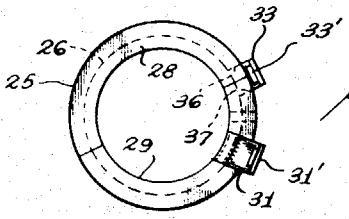
FIGURE 3 is an end view of the tube of refractory material in which the heating coil is mounted.

Referring to FIGURE 3 along with FIGURE 2, the refractory tube 25 is formed of two semicylindrical sections 28, 29. In assembly, the sections 28, 29 are placed around the heating coil 26, as by laying the coil in one section with its turns nested in the grooves of that section, and then placing the other section over the exposed portion of the coil with the turns of the coil located in the grooves of that section.

Figure 4:
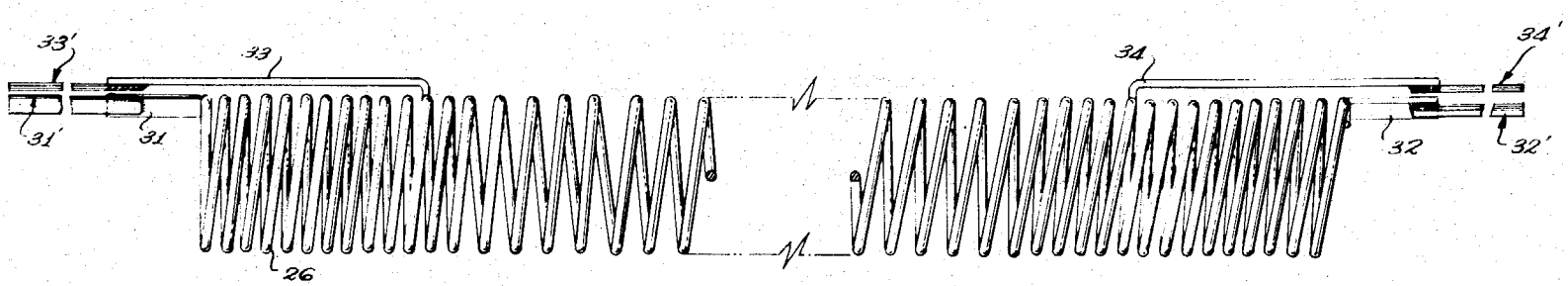
FIGURE 4 is an enlarged side elevation view of the heating coil with the metal straps welded thereto extending in opposite directions past the ends of the coil, and showing the plurality of metal leaves welded to the ends of the straps for connection to exterior terminal blocks.

Preparatory to assembling the coil 26 in the refractory tube 25 (see FIGURES 2–4), metal straps are welded to the coil. In this connection, a pair of relatively short metal straps 31, 32, of the order of four or five inches in length, are welded to the end turns of the coil 26. Additional straps 33, 34 which are several inches longer than the end straps are welded to respective turns of the coil a few inches from each thereof. As shown, the inner ends of the straps 33, 34 are bent inwardly, whereby the main bodies of the straps are spaced from the coil. The sections 28, 29 of the refractory tube 25 are formed with notches 36, 37 in the confronting edge portions thereof to form slots for the bent ends of the straps 33, 34. The bottom surfaces of these straps thus rest on the outer surface of the refractory tube 25.

This type of heating unit is one which is adapted to heat the interior of the coil 26 to extremely high temperatures, e.g., of the order of 2,500° F. which requires that the coil be formed of relatively thick stock, e.g., wire of the order of a quarter of an inch in diameter, and metal straps for connection to a current source of upwards to an inch in width and an eighth of an inch or more in thickness. With straps of such dimensions, it is necessary to perform them with the bends in the ends thereof that are welded to the coil, as by heating the stock to a high temperature and hammering it into the desired shape.

Also as indicated, the practice heretofore has been to form the outer ends of the straps with bends in them, the straps being of sufficient length that the bend ends extend out of the furnace to points where they may be connected to a current source. As explained, such a structure requires that all the straps be led out of the furnace at one end of the coil, so that the coil could be removed from that end of the furnace for replacement.

However, with my invention it is possible to remove the coil from either end of the furnace when it is necessary that it be replaced. To this end, the ends of the straps extending past the opposite ends of the coil 26 are not formed with any bends therein, but there is welded to the outer end of each strap 31–34 a stack of a plurality of elongated metal leaves 31′–34′. With reference to FIGURE 7, the edges of the stack of leaves 31′ are welded together at one end and to the one surface of the end of the strap 31, as indicated at 35. Preferably, these elements are welded together so that the welds 35 are formed of parent metal, such as by the heliarc welding technique.

After the metal straps 31–34 are welded to the heating coil 26, and the stacks of metal leaves 31′–34′ are welded to the outer ends of the metal straps 31–34, the sections of the refractory tube 25 are placed around the coil and inserted in a surrounding tube 37 of refractory material. The tube 37 is substantially coextensive with the tube 25, and is supported within the housing 16 by surrounding bands 38–40 of heat insulation (e.g. rock wool or the like) and refractory materials. The annular spaces between the ends of the bands 38–40 and the inner walls of the caps 21, 22 are filled with rings 41 of suitable refractory material.

Figure 5:
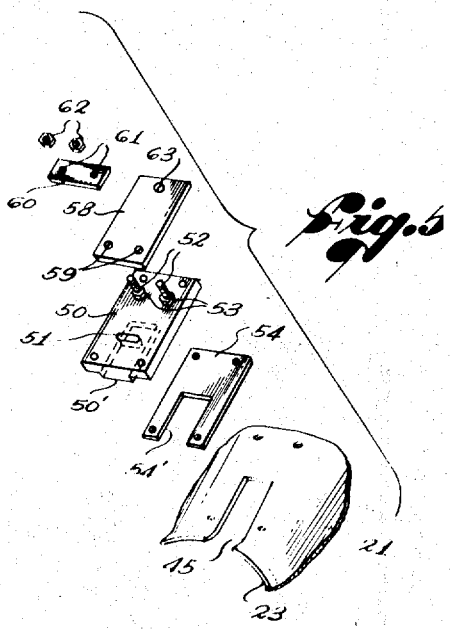
FIGURE 5 is an exploded view of the elements of a terminal block.

After sliding the assembly of the refractory tube and heating coil 26 inside the tube 37, the stacks of metal leaves 31′–34′ are led out of the opposite ends of the housing 16 and clamped to electrical terminal blocks 44. Referring to FIGURES 5 and 6 along with FIGURES 1 and 2, the respective slots 45 for each of the stacks of leaves 31′–34′ are formed in the end caps 21, 22 of the housing 16, each slot 45 extending outwardly from the central openings 23, 24. Additionally, the pair of slots 45 in each end of the housing are located in the forward portions of those ends, i.e., nearest the front of the cabinet module. In this connection, it will be observed that the straps at each end are welded to portions of the coil that are angularly displaced. Accordingly, the slots 45 are similarly displaced in the ends of the housing.

Referring to FIGURES 2, 5 and 6, each terminal block 44 is formed of a rigid rectangular block 50 of electrical insulation which on its lower surface is provided with a downwardly extending projection 50′ extending part way along its length of one end thereof, and which is adapted to be inserted in the slot 45. The block 50 has a rectangular opening 51 which extends through the bottom projection 50′. Additionally, the block 50 is provided with a pair of upwardly projecting threaded bolts 52, the heads of which (see FIGURE 6) are located in countersunk openings of sufficient size that the lower surfaces of the heads are above the plane of the lower surface of the block. The bolts 52 may be embedded in the block or, as indicated, secured in place by nuts 53 threaded thereon to tightly engage the upper surface of the block.

As shown, the block 50 is kept out of contact with the surface of the end cap 21 by a strip 54 of heat insulation, which may be made of asbestos or the like. The insulation strip 54 is a rectangular element of the outer dimensions of the block 50 having a slot 54′ therein of the dimensions of the slot 45. The block 50 is secured to the end cap 21, with the insulation strip 54 sandwiched therebetween, in any suitable manner, e.g., as by nut and bolt connections 55.

Preparatory to securing the block 50 in place, the stack of metal leaves are threaded through the slot 45 and the opening 51 in the block 50. Thereafter, the block is lowered along the leaves to be seated against the outer surface of the end cap 21 and secured in place. Referring to FIGURE 6, the grouped metal leaves 31′ are then bent and placed over the upper surface of a conductor plate 58 which is supported at one end on the threaded ends of the bolts 52, such bolts extending through openings 59 (see FIGURE 5) in the plate. Then a metal strip 60 having openings 61 aligned with the bolts 52 is lowered onto the bolts against the outer leaf of the stack 31', and nuts 62 are threaded onto the upper ends of the bolts 52 and tightened securely to compress the leaves into firm face-to-face contact with each other and insure firm face-to-face contact between the bottom leaf of the stack and the upper surface of the conductor plate 58.

With the terminal blocks 44 secured to the ends of the housing 16, the cartridge unit 15 is ready for mounting in the cabinet module 12. It is placed in the tray 17, which has been pulled forward to the exterior of the cabinet, and with the terminal blocks 44 located in the forward positions as shown in FIGURE 1. Before the tray 17 is shoved inwardly, electrical connections within the base cabinet portion 11 are connected to the terminal blocks 44. To this end, and referring to FIGURES 2 and 6, each conductor plate 58 extends past the outer end of the insulation block 50, and is provided with an opening 63 to receive the threaded end of a bolt 64 on which the lug 65 of an insulated conductor 66 is placed. A nut and washer combination 67, 68 are placed over the upper end of the threaded bolt 64, and the nut turned on the bolt until the lug 65 is securely clamped to the conductor plate 58.

After the conductors 66 are connected to the terminal blocks 44, the tray 17 is moved inwardly to position the capsule 15 inside the cabinet module 12. When this is done, the openings 23, 24 in the ends of the housing 16 are brought into alignment with enlarged openings 70 in the ends of the cabinet. Referring to FIGURE 2, along with FIGURE 1, an end plug 71 of refractory materials is inserted in the opening 70. The outer diameter of the plug 71 is only slightly less than the diameter of the opening 24 in the end cap 22, so that it can readily pass through that opening. The plug 71 at its inner end has a reduced diameter, indicated at 72, and at its inner end the plug abuts the end of the refractory tube 25 in which the heating coil 26 is located. As shown, the plug 71 is notched at its inner end, as indicated at 73, to provide a passage for the stack of metal leaves 34', to facilitate leading the stack of leaves to the exterior of the housing with a minimum of bending.

After the plug 71 is inserted in each end of the housing, a sealing ring 74 of suitable heat insulation material such as asbestos rope, is placed around the axial lip or flange 75 which defines the end opening 24 of the housing 16. Thereupon, a short cylindrical element 77 is inserted in the opening 70 of the cabinet 13, such element 77 having an external flange 78 which fits against the outer surface of the cabine 13. The inner end of the element 77 is curved or flared slightly, and engages the sealing ring 74. The flange 78 is secured to the wall of the cabinet 13, as by means of a trim plate 81 placed around the flange, and with nut and bolt connections 82, 83 for clamping the flange 78 between the plate 81 and the wall of the cabinet 13. Thus clamped, the inner end 79 of the cylindrical element 77 firmly engages the sealing ring 74 and presses it against the end cap 22. Thereafter, the front panel 14 is secured in place.

With the furnace capsule 15 thus completed, it is ready for use. In such use, a conventional quartz tube 85 (see FIGURE 2) is extended through the cabinet from end to end. The ends of the quartz tube 85 are supported by the refractory plugs 71 and the outside trim plates 81, such elements for this purpose being provided with internal openings to slidably receive the quartz tube.

With the aobve-described arrangement for clamping the ends of the housing 16 in place, the cartridge 15 cannot readily be dislodged from operating positions, as upon opening the front panel and inadvertently pulling on the tray 17. Before the tray can be pulled out, and pull the cartridge 15 with it, the end clamping elements 77 have to be removed, along with the end refractory plugs 71. Also, of course, the quartz tube 85 must be removed. However, the operations for removing these elements can be seen to be easy to accomplish, and can be done in a minimum of time when it is desired to service or replace the cartridge 15.

To remove the heating element itself, it is necessary only to remove the outer trim plates 81, the clamping cylinder 77 and the refarctory plug 71 as above described, and to pull the tray 17 out. The conductors 66 are then removed from the conductor plates 58, and the stacks of leaves 31'–34' are unclamped from the conductor plates. Since the leaves of the stack 31'–34' are relatively thin members, being formed of, for example, elements of the order of .025-inch thickness, they can readily be bent inwardly to clear the opening in the supporting refractory tube 37. Since the interior of the supporting tube 37 is equal to the outer diameter coil-supporting tube 25 and the thickness of one of the straps 33, 34, the unit assembly of the heating coil with its straps and supporting tube 25 is easily slidable in the support tube 37, and can easily be pulled out of either end of the support tube 37.

After removal of the heating unit as above described, a replacement unit of the same construction can be slidably inserted in the support tube 37. In this connection, it will be understood that the entire terminal block assemblies 44 are removed in order to facilitate bending the stacks of leaves 31'–34' inwardly as described for easy removal of the heating unit. When a new unit is positioned in the support tube 37, the stacks of leaves welded to the metal straps thereof are forced outwardly through the slots 45, and the terminal blocks assembled as in the manner previously described.

The above-described operations for replacing the heating unit while the housing 16 remains in the tray 17 may not be permitted in an area where the dust from the refractory material cannot be allowed to enter the surrounding air. In that case, since the housing 16 merely sets in the tray 17, the entire cartridge 15 can be lifted out of the tray and removed from the area while the heating unit is being replaced.

Still further, if production operations must be continued while a heating unit is being replaced, it is a simple matter to lift the entire cartridge unit 15 from the tray 17, replace it with another complete cartridge, making the necessary connections for the conductors, and quickly installing the new cartridge in place. Then the cartridge that has been replaced can be taken out of the area and its heating unit replaced, whereby it is available as a standby cartridge for use whenever it is needed.

From the foregoing, it will be apparent that modifications can be made in various parts of the invention illustrated and described herein without departing from its spirit and scope. Accordingly, I do not intend that my invention be limited, except as by the appended claims.

I claim:

1. Furnace apparatus comprising:

an elongated housing having end walls with central openings therein;

a body of refractory material supported in said housing and having a cylindrical opening aligned with said central openings;

an elongated heating coil extending through the opening in said body;

a respective rigid metal strap welded to each end of said coil, said straps extending parallel to said axis;

a respective stack of elongated metal leaves welded at one end to the outer end of each strap, said stacks at their opposite ends extending through the central openings in said end walls, the outer ends of said stacks being bent outwardly, said outer ends being bendable inwardly to permit said coil to be removed through either end of said body and housing;

and respective electrical terminal means insulatingly and releasably supporting said outer end of said stacks against said end walls.

2. Furnace apparatus as defined in claim 1 including tap connections to turns of the coil inwardly of the ends thereof, said connections being formed of rigid metal straps extending parallel to said coil past the opposite ends thereof;

a pair of elongated stacks of metal leaves each welded at one end to the outer end of one of the last-mentioned metal straps, said metal leaves being bent outwardly and bendable inwardly in the same manner as the first-mentioned stacks;

and respective electrical terminal means insulatingly and releasably supporting the outer ends of said last-mentioned stacks against said end walls.

3. Furnace apparatus as defined in claim 2, including a tube of refractory material within the cylindrical opening in said body, said tube enclosing said coil, said tube being formed of semicylindrical sections, said straps forming the tap connections extending along the outer surface of said tube, the inner ends of such straps being bent inwardly and extending through said tube.

4. Furnace apparatus as defined in claim 3, including a plug of refractory material filling the opening in each end wall of said housing and abutting the adjacent end of said tube, said plugs having central openings to slidably receive and support the ends of a quartz tube extending through the center of said coil.

5. Furnace apparatus as defined in claim 4, including a cabinet having end walls with openings therein and spaced from the end walls of said housing, said plugs extending substantially to the end walls of said cabinet;

and means for releasably clamping said housing between the end walls of said cabinet.

6. Furnace apparatus as defined in claim 5, including a tray in the bottom of said cabinet and slidable to the exterior thereof, and said housing being supported in said tray.

7. In combination:

an elongated heating coil;

a pair of axially directed, rigid metal straps welded to the ends of the coil;

additional rigid metal straps welded to the turns of the coil intermediate the ends thereof, each of said additional straps extending in opposite directions along said coil and past the ends thereof;

and a respective stack of elongated metal leaves welded together at one end and to the outer end of each metal strap.

8. The combination defined in claim 7, said additional straps being pre-formed with bends in the end thereof that are welded to the coil turns, whereby such straps are spaced from said coil;

and a tube of refractory material surrounding said coil, said additional straps extending along the outer surface of said tube, the bent ends of said straps extending through the wall of said tube.

9. A furnace structure comprising:

a base cabinet housing electric controls for respective furnace heating units;

cabinet modules for each unit stacked on said base cabinet, each module being formed as a box having a removable front panel;

an elongated capsule enclosing a heating unit having a heating coil;

a drawer mechanism mounted at the floor of each module and having a slidable tray carrying a respective capsule, said tray being slidable to a closed position in which said capsule thereon is inside its module, said tray being slidable to an open position in which, when the front panel is removed, the capsule thereon is held exteriorly of its module;

electrical connecting means for each coil extending from the base cabinet to each module;

means carried by each capsule for releasably connecting selected points on each coil to be associated electrical connecting means;

and means for releasably holding each capsule in its module in the closed position of its tray.

10. A furnace structure as defined in claim 9, wherein each capsule has openings at the ends thereof, wherein said releasable connecting means includes respective stacks of leaf conductor strips welded at one end to a respective rigid metal strap, each strap being welded to a selected point on its associated coil, the outer end of each stack extending through the opening in its capsule nearest the point of the coil to which it is conductively connected;

and a respective terminal means for releasably and insulatingly holding the outer end of each stack to the adjacent end of the capsule, and for conductively connecting a respective electrical connecting means to the stack.

*11. A diffusion furnace comprising a base unit, a cabinet unit and at least one cartridge heating assembly, electric control means for said cartridge heating assembly housed in said base unit, said cabinet unit removably housing said cartridge heating assembly, said cartridge heating assembly comprising an elongated heating coil, insulating material, and an elongated outer shell, said insulating material being interposed between said heating coil and said shell, said cabinet unit having end members generally perpendicular to the axis of said elongated heating coil, at least one of said end members permitting access to the interior of said elongated heating coil and exposable supporting means within said cabinet unit releasably supporting said cartridge heating assembly whereby when said assembly is exposed from said cabinet unit, said assembly can be readily removed from said supporting means.*

*12. A diffusion furnace as in claim 11 wherein a plurality of said cartridge heating assemblies are horizontally disposed in a vetrically stacked relationship in said cabinet unit.*

*13. A diffusion furnace as in claim 11 wherein said supporting means for said cartridge heating assembly comprises a member slidably supported by said end members.*

*14. A diffusion furnace as in claim 11 wherein said cabinet unit has a back wall and a front wall, said front wall being at least in part removable to permit said cartridge heating assembly to be exposed.*

*15. A diffusion furnace as in claim 11 wherein a support tube formed of refractory material is interposed between said shell and said heating coil, said support tube and said heating coil being disposed in coaxial relationship.*

*16. A diffusion furnace wherein the support tube defined in claim 15 has an interior groove to nestably receive the outer portions of said elongated heating coil.*

*17. A diffusion furnace as in claim 14 wherein said supporting means is a drawer member slidably supported by said end members.*

References Cited

The following references, cited by the Examiner, are of record in the patented file of this patent or the original patent.

UNITED STATES PATENTS

| | | | |
|---|---|---|---|
| 1,282,330 | 10/1918 | Van Aller | 219—390 |
| 1,588,556 | 6/1926 | Thompson | 339—9 |
| 1,930,836 | 10/1933 | D'Amico | 219—390 |
| 2,527,026 | 10/1950 | Mucher | 338—323 |
| 2,535,379 | 12/1950 | White | 219—403X |
| 3,178,665 | 4/1965 | Matheson et al. | 338—299 |
| 3,299,196 | 1/1967 | Lasch et al. | 13—24 |

FOREIGN PATENTS

| | | | |
|---|---|---|---|
| 877,776 | 9/1961 | Great Britain | 219—541 |
| 930,298 | 8/1947 | France | 13—25 |

VOLODYMYR Y. MAYEWSKY, Primary Examiner